United States Patent [19]
Plockl
[11] 4,107,702
[45] Aug. 15, 1978

[54] ARRANGEMENT FOR READING OUT AN OPTICAL MEMORY

[76] Inventor: Johann Plockl, Jagdstr. 4, 8025 Unterhaching, Fed. Rep. of Germany

[21] Appl. No.: 733,718
[22] Filed: Oct. 18, 1976

[30] Foreign Application Priority Data
Oct. 30, 1975 [DE] Fed. Rep. of Germany ....... 2548649

[51] Int. Cl.² .............................................. G03B 17/08
[52] U.S. Cl. ...................................................... 354/17
[58] Field of Search .......................... 354/17, 12, 13, 5

[56] References Cited

U.S. PATENT DOCUMENTS 2,900,884 8/1959 Coleman ............................... 354/17
3,405,616 10/1968 Plooij ..................................... 354/17
3,618,487 11/1971 Tiefenthal et al. .................... 354/17
3,710,698 1/1973 Sinnott et al. .......................... 354/7

*Primary Examiner*—John Gonzales
*Attorney, Agent, or Firm*—W. G. Fasse; W. W. Roberts

[57] ABSTRACT

An arrangement for reading out selected characters from a font of characters stored on a stationary optical memory is disclosed. An equal number of light sources and lenses are arranged in front of a matrix plate. The images of the light sources are brought to a focus in a projecting lens, which is used to image the characters in a common plane. A number of deflecting elements is used to combine all images at a common location where the photosensitive material is placed.

6 Claims, 3 Drawing Figures

ARRANGEMENT FOR READING OUT AN OPTICAL MEMORY

BACKGROUND OF THE INVENTION

1. Field of the invention

This invention relates to apparatus for reading out a stationary optical memory, in which a light source is associated with each character, all characters being imaged by optical elements to a common location.

Systems like this are used for fast character reading for photographic type composition apparatus or information retrieval systems for computers.

Known techniques employed in the field of high speed printing involve selecting characters to be printed from a given font. The selection process may, for example, include deflecting an optical beam to the location of a character and projecting an image of the selected character onto a suitable recording medium.

2. Description of prior art

An arrangement like this is described in German patent publication 2 342 412. The characters to be projected are illuminated by flash lamps. Each character is associated with a lens, the characters being arranged at the focal point of the lenses in order to collimate the beams emerging from the characters. A concave mirror is used to de-collimate the parallel rays and project their image through the center of the optical matrix. Therefore a special optical matrix is necessary bearing no characters in its center.

In addition, in spite of the collimated beams, the quality of the images of marginal characters is poor as compared to images of characters located near the optical axis.

SUMMARY OF THE INVENTION

It is an object of the present invention to provide an improved arrangement for reading out a stationary optical memory comprising a matrix of characters.

It is a further object of the invention to provide an arrangement for reading out a stationary optical memory with an improved quality of the projected characters, especially of marginal characters.

It is an additional object of the invention to provide an arrangement with a matrix of characters arranged in regular rows and columns without a blank space, which can therefore be accommodated on a smaller plate.

It is still another object of the invention to provide an arrangement for photocomposing characters in which all characters are reproduced with equal density on the photographic material.

To achieve the foregoing objects there is provided an arrangement for reading out selected characters from a font of characters stored on a stationary optical memory, comprising a number of light sources each associated with one of said characters for illuminating the same selectively, all of said characters being imaged onto a common location by an optical arrangement, this arrangement comprising one lens and two sets of optical elements performing together said imaging onto said common location, the lens imaging the characters into a common image plane, one set of said optical elements deflecting the different rows of said characters onto said common location and the second set of said optical elements deflecting the different columns of said characters onto said common location.

DETAILED DESCRIPTION OF THE INVENTION

Figure 1:
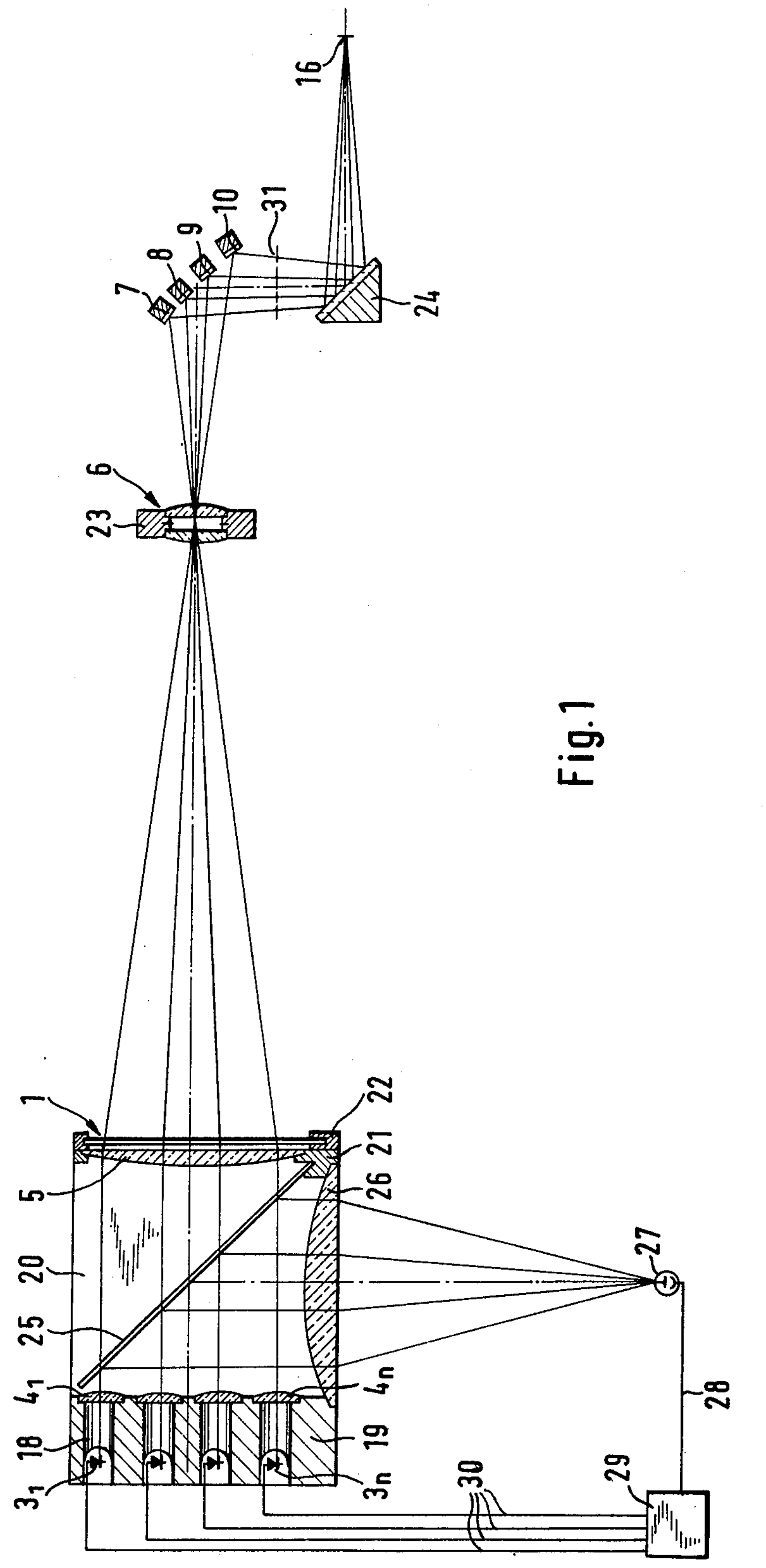
FIG. 1 is a cross sectional veiw along the optical axis of a preferred embodiment of the invention.
Figure 2:
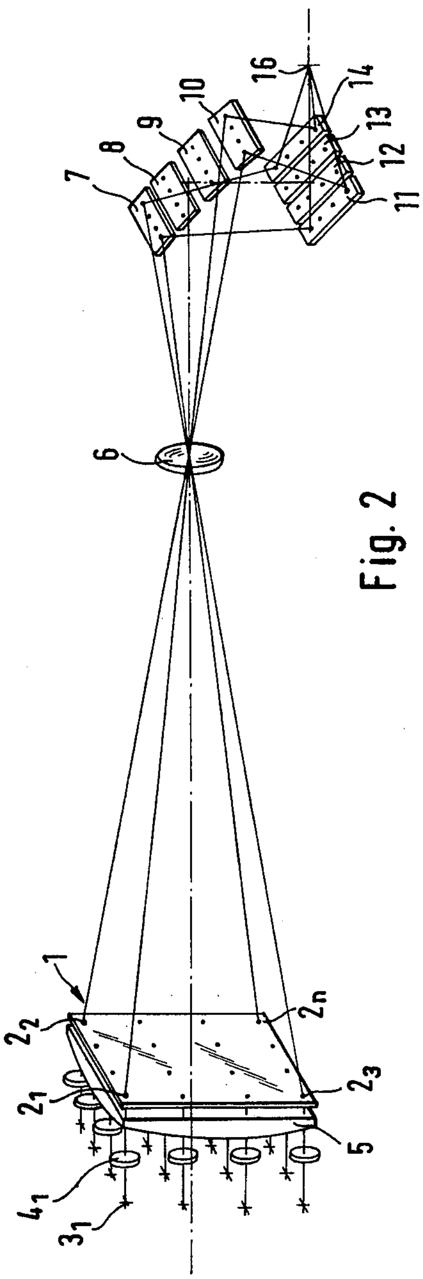
FIG. 2 is a front view of the same embodiment.

As is illustrated in FIG. 1 and 2, the optical memory or matrix plate 1 comprising a transparent plate, such as a glass plate, on which the characters $2_1 \ldots 2_n$ are stored. Each character is provided with an illuminating system consisting of a light source $3_1 \ldots 3_n$ and a lens $4_1 \ldots 4_n$. Behind the lenses $4_1 \ldots 4_n$ a common lens 5 is provided for all illuminating systems. This lens focuses all illuminating rays into the projection lens 6. The matrix plate 1 is arranged behind and as close to the lens 5 as possible.

The light sources $3_1 \ldots 3_n$, which may be light emitting diodes (LEDs), are arranged in the focal points of the respective lenses $4_1 \ldots 4_n$ and the lens 5 thereby achieving a good illumination of the characters. The light beam emering from each light source impinges on each character on the matrix plate as a parallel beam. The focal length of lens 5 corresponds to the distance between this lens and lens 6. In this way all principal rays of the characters to be projected intersect in the focal point of lens 5 and therefore in the center of lens 6.

The focal length of lens 6 is selected to correspond to half the distance between the matrix plate 1 and lens 6. The characters to be projected are therefore arranged at a distance equal to twice the focal length of lens 6, thereby achieving a 1 : 1 image ratio for all characters independent of their distance from the optical axis.

As the rays which form the images of the light sources emerge from lens 5 as parallel beams, the light sources are focused by lens 6 in its focal plane 31. The mirrors 7, 8, 9, 10 and the mirrors 11, 12, 13, 14, which represent the optical deflecting elements to combine the images of the characters at a common location 16, are arranged on both sides to plane 31, which means, on opposite side of the constriction of the beams.

Figure 3:
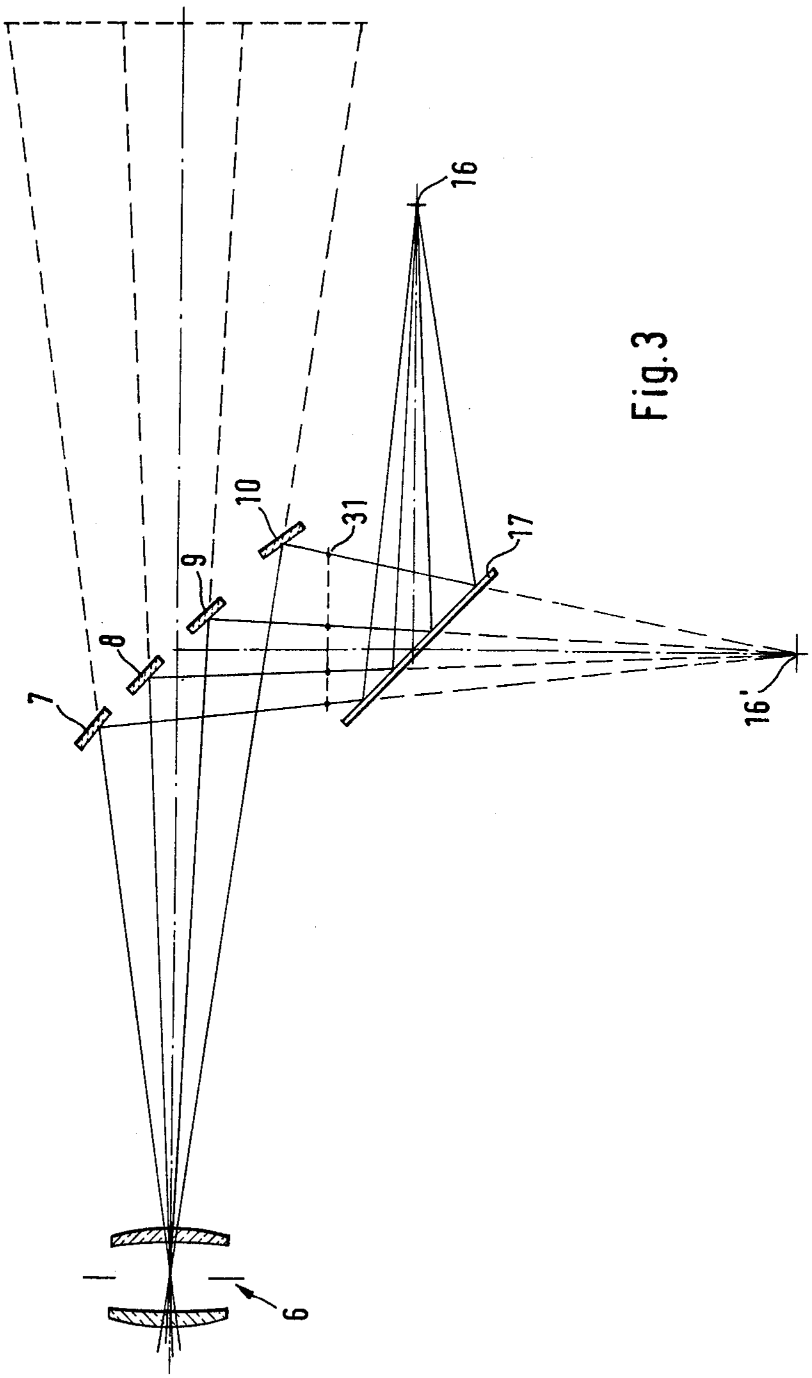
FIG. 3 is an enlarged view of a part of the arrangement showing the principal rays.

As can be seen best in FIG. 3 the deflecting mirrors 7 . . . 10 are arranged at an angle of approximately 45° to the optical axis of the lens. They are tilted to each other in such a way as to combine all rays coming from the different horizontal rows of characters at the image location 16'.

As illustrated in FIG. 2 and 3 the mirrors 11 . . . 14 are arranged in a plane 17, which is inclined 45° to the deflected optical axis. These mirrors are rotated by 90° as compared to the mirrors 7 . . . 10 and similarely tilted so as to combine all rays coming from the different vertical columns at the image location 16. In this way all characters contained in the matrix plate 1 are imaged at the location 16 whenever the light source associated with the corresponding character is energized.

The general design of a device according to the invention is illustrated in FIG. 1. The diodes $3_1 \ldots 3_n$ are mounted in bores 18 of a housing 19 and equally arranged as the corresponding characters $2_1 \ldots 2_n$ on the matrix plate 1. To accept the lenses $4_1 \ldots 4_n$ the diameter of the boreholes are wider on the opposite side. In the example shown the housing 19 is connected to a front plate 21 by sides 20, the front plate 21 serving as mount for the common lens 5.

Directly in front of lens 5 the matrix plate 1 is fixed to the front plate 21 by a mounting 22. The illustrated assembly of the optical system is mechanically very rugged. The diodes may be adjusted to the focal point of the system of lenses 4 and 5 by sliding them in the bores. The housing 19 is secured to the apparatus by suitable means. At a distance from the housing 19 lens 6 is connected to the assembly by its mount 23.

Close to the location 31 of the beam constriction the mirrors 7, 8, 9, 10 and 11, 12, 13, 14 are mounted to the assembly by mirror mounting 24. At the location 16, which is the locus of all images of the projected characters of plate 1, a photographic film or a similar photosensitive material is provided.

A device for reading out an optical memory or character plate is particularly useful for photocomposing. In this case additional demands are placed on the speed of the light sources and on equal illumination of all characters.

LEDs may be used for this purpose which emit in the visible part of the spectrum, e.g. red- or green-emitting LEDs, as the type MV52 (Monsanto), which have fast response, long life time and high intensity when used in a pulsed mode.

According to FIG. 1 an additional device is provided by which the emitting duration or the current of the LEDs may be controled. In this way the resulting density of the film at the location 16 may be kept independent of changes of temperature and life time of the LEDs. A semitransparent mirror 25 is therefore provided which deflects part of the intensity emitted by the LEDs. This radiation is collected by a lens 26 on a photoelectric detector 27. The output signal of this detector is fed to a suitable control unit 29 which controls through lines 30 the emitting duration of the LEDs $3_1 \ldots 3_n$.

The LEDs are energized by a control device not shown in the figures. This device is actuated by a keyboard by which the characters to be projected to the location 16 can be selected.

In the illustrated embodiment the imaging ratio is 1:1. By using an additional variable optical system known to those skilled in the art the image size of the characters may be changed as desired.

It is to be mentioned that prisms may be used in place of the mirrors 7 . . . 14.

Although in the drawings only four mirrors 7 . . . 10 and four mirrors 11 . . . 14 corresponding to four rows and four columns of characters are shown, it is to be understood that this is merely for the sake of clarity and that the number of rows and columns and corresponding mirrors depends on the number of characters necessary.

The arrangement may be modified by omitting the lens 5. In this case the individual systems consisting of LEDs 3 and lenses 4 must be inclined to each other in order to make the principle rays of these systems intersect in the center of lens 6.

The arrangement can also be protected by a suitable cover.

The foregoing description is intended to be illustrative, only. Various changes or modifications in the disclosed embodiments may occur to those skilled in the art. It is understood, therefore, that all such modifications which would be apparent to one skilled in the art are included within the scope of the present invention.

What is claimed is:

1. An arrangement for reading out selected characters from a font of characters stored on a stationary optical memory, comprising a number of light sources each associated with one of said characters for illuminating the same selectively, all of said characters being imaged onto a common location by an optical arrangement comprising one lens and first and second sets of optical elements performing together said imaging onto a common location, the lens imaging the characters into a common image plane, said first set of said optical elements deflecting the different rows of said characters onto said common location, said second set of said optical elements deflecting the different columns of said characters onto said common location each of said first and second sets of optical elements comprising a plurality of individual flat mirrors operating as optical deflecting members for combining the images of the characters at said common location, said arrangement further comprising mounting means for each plurality of deflecting members to maintain said sets of deflecting members in respective predetermined, fixed positions relative to each other on opposite sides of a common plane, and wherein each mirror deflecting member faces said common plane with its reflecting surface, wherein said deflecting optical elements of said first set comprise reflecting elements tilted relative to one another, each element being associated with one row of said characters, and wherein said second set of said deflecting optical elements comprises reflecting elements tilted relative to one another, each element being associated with one column of said characters, so that each mirror element reflects only light from its respectively associated row or column.

2. An arrangement according to claim 1, in which the optical memory is placed in a plane spaced from said lens by twice the focal length thereof and normal to its optical axis.

3. An arrangement according to claim 1, in which the two said sets of optical elements are situated close to the constriction of the imaging beams.

4. An arrangement according to claim 1, in which LEDs which emit in the visible region are used as said light sources.

5. The arrangement of claim 1, further comprising semi-transparent mirror means arranged to deflect a portion of the light emitted by all of said light sources, photoelectric detector means and lens means positioned to collect and direct said deflected light portion onto said photoelectric detector means, as well as control means operatively interconnected between said photoelectric detector means and each of said light sources for individuality controlling the emitting duration of said light sources.

6. The arrangement of claim 1, further comprising support block means, a plurality of bores in said support block means, said bores corresponding in number to said number of light sources, each bore forming a socket for its respective light source which is individually inserted in its respective socket.

* * * * *